Oct. 18, 1955    J. H. ELLIOTT    2,721,033
HEATING AND VENTILATING SYSTEM
Filed Jan. 3, 1955    2 Sheets-Sheet 1

INVENTOR.
JAMES H. ELLIOTT.
BY
Lockwood, Galt, Woodard & Smith
ATTORNEYS.

Oct. 18 1955 J. H. ELLIOTT 2,721,033
HEATING AND VENTILATING SYSTEM
Filed Jan. 3, 1955 2 Sheets—Sheet 2
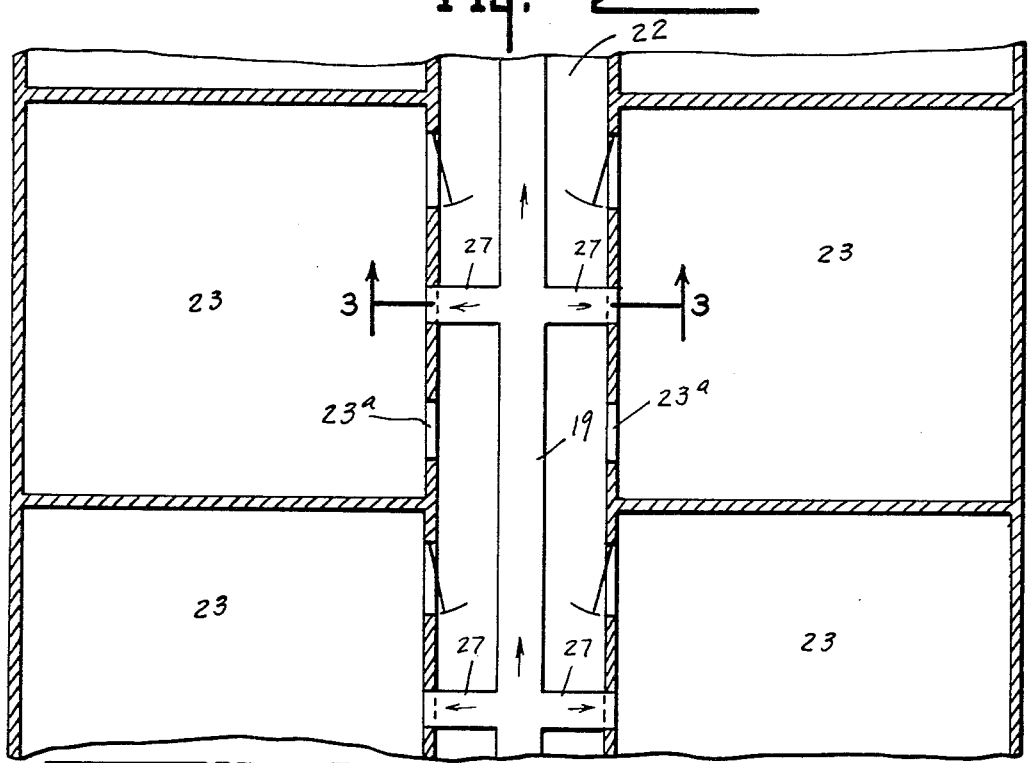
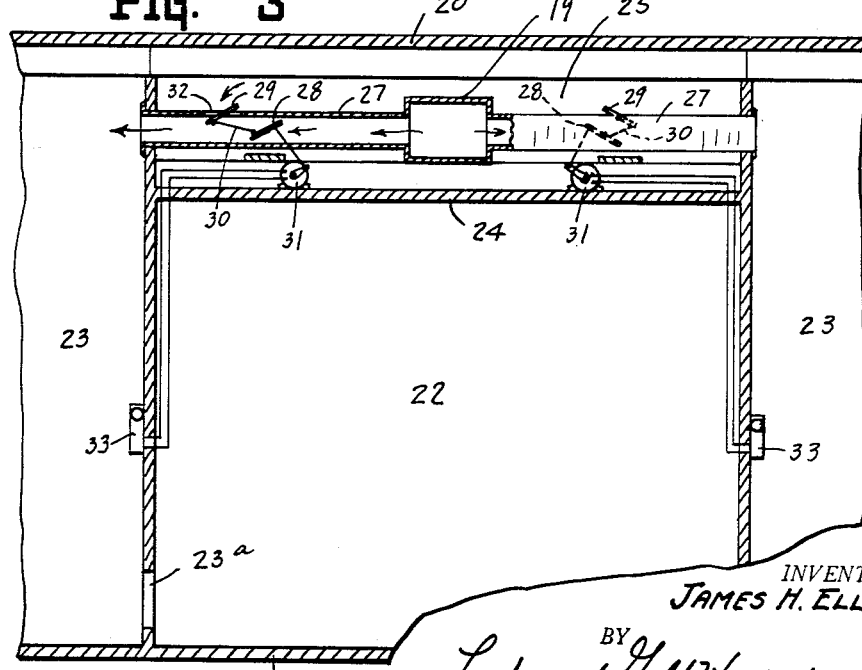
INVENTOR.
JAMES H. ELLIOTT.
ATTORNEYS.

United States Patent Office 2,721,033
Patented Oct. 18, 1955

2,721,033

HEATING AND VENTILATING SYSTEM

James H. Elliott, Indianapolis, Ind., assignor of one-half to Charles R. Elliott, Indianapolis, Ind.

Application January 3, 1955, Serial No. 479,568

5 Claims. (Cl. 237—48)

This invention relates generally to ventilating systems and more particularly to a ventilating and heating system having means for feeding air into a plurality of rooms with individual temperature control in each room. Conventional ventilating and heating systems comprise a separate warm air duct and a separate return duct for each heated room, the two separate ducts extending from the furnace to each room. The furnace is provided with means for mixing cold air and heated air, thereby to provide warm air at a certain temperature for all rooms of a building. There is no provision for controlling the temperature in each room independently of the temperature of other individual rooms.

Conventional heating and ventilating systems as described above require excessive lengths of ductwork, whereby expense of duct materials and installation is very substantial. Also, systems of this character are sometimes difficult to control in such a manner that each room receives the amount of warm air required to heat it to a desired temperature. In other words, there may be excessively warm rooms and excessively cool rooms in a given building, depending upon ambient outside temperatures and wind conditions.

The principal object of this invention is to reduce the amount of duct required to heat a building and to provide a duct system of such character that only one installed warm air duct is required to supply warm air to all of the rooms in a given building.

Another object of this invention is to provide a heating and ventilating system wherein the temperature of the air supply to an individual room of a building may be individually controlled with respect to the individual room.

In accordance with this invention there is provided a duct system for heating and ventilating a building comprising a main trunk warm air duct connected to a heating furnace, individual feeder ducts communicating with each individual room and said main trunk duct, a cold air duct surrounding said main trunk and feeder ducts, each feeder duct including damper means for mixing air from said main trunk warm air duct and said cold air duct, and electrically or pneumatically operated means individual to each room for controlling said damper means.

Further in accordance with this invention, there is provided a heating and ventilating system for a building comprising a furnace room in said building wherein a furnace may be installed for heating air, and blower means may be provided for feeding air to said furnace, said building including a sealed duct space above the ceiling of a corridor, said space being connected with said blower, whereby unheated air may be circulated therein, a main trunk warm air duct connected with said furnace and extending through said sealed space, a feeder means extending from said main trunk duct into each room and including damper means for mixing warm air from said main trunk warm air duct and said sealed space for maintaining pretermined temperature within each individual room.

The full nature of the invention will be understood from the accompanying drawings and the following description and claims:

Fig. 2 is a horizontal cross section of a portion of a duct system as provided in accordance with this invention.

Fig. 3 is a cross section taken on line 3—3 of Fig. 2.

Figure 1:
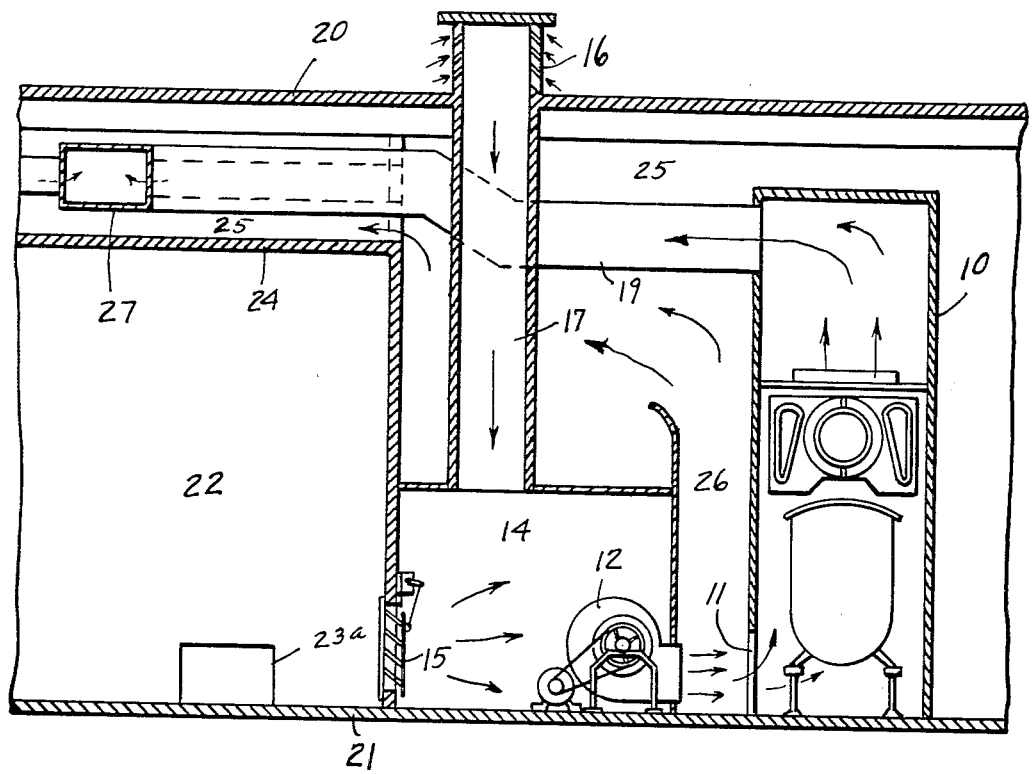
Fig. 1 is a vertical cross section of a furnace and a portion of a duct system as provided in accordance with this invention.

Referring to the drawings, this invention comprises a warm air furnace or heat exchanger 10 of conventional construction having an intake opening 11 through which a blower 12 forces unheated air. Unheated air may be a mixture of return air entering a blower chamber 14 through a remotely controlled adjustable shutter 15 and outside air entering the blower chamber 14 from an intake opening 16 and cold air duct 17. The mixture of outside air and return air is governed by the setting of the shutter 15.

For distributing heated air through a building there is provided a main trunk warm air duct 19 through which heated air from the furnace is circulated under pressure from the blower 12. It may be assumed that the building to be heated is a structure such as that conventionally used for schools and comprising a roof 20, a floor 21, a corridor 22 and a plurality of individual rooms 23. Corridor 22 may serve as a return duct for supplying air to the shutter 15. In turn, air may be exhausted into corridor 22 through passages 23a in the walls of each room, as illustrated in Fig. 3. Over the corridor there is provided a ceiling 24 over which is extended the main trunk hot air duct 19. Between ceiling 24 and roof 20 there is a space which normally is unused, and in accordance with this invention this space is sealed when the building is constructed and is used as a cold air duct 25. A mixture of cold air under pressure is led from the blower 12 through the passage 26 and into the cold air duct 25. Thus, there is provided for heating all of the rooms of the building a main trunk hot air duct 19 and a main cold air duct 25, the only installed ductwork being the hot air duct 19 which may be formed of sheet metal in accordance with conventional practice.

For supplying air from the hot air duct 19 and the cold air duct 25 to each of the rooms 23, there are provided individual room heating and air mixing ducts 27. In each of the ducts 27 there are provided a hot air damper 28 and a cold air damper 29 linked to one another by means of a tie rod 30 and rotated by means of a control motor 31. The cold air damper 29 may be mounted in an opening 32 in the upper surface of each feeder duct 27, thereby to admit cold air from the main trunk cold air duct 25. For controlling the dampers 28 and 29 by means of motor 31, there is provided in each room a conventional thermostatic control unit 33.

In operation the blower 12 feeds fresh air, entering the building through duct 17, and return air, coming through the shutter 15, this mixture of air entering the furnace through the opening 11 and entering the cold air main trunk duct 25 from the passage 26.

Warm air from the main trunk duct 19 flows through each feeder duct 27 past the damper 28 in a quantity determined by the position thereof. Cold air or unheated air in the duct 25 enters the feeder duct 27 through opening 32 in a quantity determined by the position of damper 29. The dampers 28 and 29 are positioned as required by the setting of thermostat 33, whereby a mixture of warm air and unheated air is fed into each room 23 to maintain each room at the temperature corresponding with the setting of thermostat 33. Thus, each individual room can be heated to any desired temperature regardless of its location within the building or with respect to the furnace. It should be noted that the control system comprising motor 31 and thermostat 33 is conventional and, hence, the details thereof are not explained herein. It will be readily understood that automatic means such as electrical or pneumatic control means may be employed for operating dampers 28, 29.

From the foregoing description it will be apparent that this invention provides substantial saving in a duct system because of the fact that a single main trunk warm air duct may be installed in combination with a furnace to form a complete heating system. The space over the ceiling 24 and under roof 20 which normally is unused forms a cool air duct, thereby contributing substantially to the saving in duct work. In addition, the system provides temperature controlled air to each individual room within the building.

The invention claimed is:

1. A heating and ventilating system for a building structure comprising a furnace room having a return air and cold air conveying means opening therein, a furnace in said room for heating air, a main trunk warm air duct connected to said furnace and extending adjacent to each room of said building, individual feeder ducts communicating with each individual room and said main trunk duct, a sealed cold air duct surrounding said main trunk and feeder ducts and comprising sealed ceiling and wall structure of said building, each feeder duct including damper means within said feeder duct and opening into said cold air duct for mixing air from said main trunk warm air duct and said sealed cold air duct, automatically operated means individual to each room for controlling said damper means, and blower means in said furnace room for feeding unheated air into said furnace and into said cold air duct.

2. A heating and ventilating system for a building structure comprising a furnace room having a return air and cold air conveying means opening therein, a furnace in said room for heating air, a main trunk warm air duct connected to said furnace and extending adjacent to each room of said building, individual feeder ducts communicating with each individual room and said main trunk duct, a cold air duct surrounding said main trunk and feeder ducts, each feeder duct including damper means within said feeder duct and opening into said cold air duct for mixing air from said main trunk warm air duct and said cold air duct, automatically operated means individual to each room for controlling said damper means, and blower means in said furnace room for feeding unheated air into said furnace and into said cold air duct.

3. A heating and ventilating system for a building structure comprising a means for heating air, a main trunk warm air duct connected to said means and extending adjacent to each room of said building, individual feeder ducts communicating with each individual room and said main trunk duct, a cold air duct surrounding said main trunk and feeder ducts, each feeder duct including damper means within said feeder duct and opening into said cold air duct for mixing air from said main trunk warm air duct and said cold air duct, and blower means for feeding unheated air into said heating means and into said cold air duct.

4. A heating and ventilating system for a building structure comprising a means for heating air, a main trunk warm air duct connected to said means and extending adjacent to each room of said building, individual feeder ducts communicating with each individual room and said main trunk duct, a cold air duct adjacent said main trunk and feeder ducts, each feeder duct including damper means within said feeder duct and opening into said cold air duct for mixing air from said main trunk warm air duct and said cold air duct, and blower means for feeding unheated air into said cold air duct.

5. A heating and ventilating system for a building structure comprising a means for heating air, a main trunk warm air duct connected to said means, individual feeder ducts communicating with each individual room and said main trunk duct, a sealed cold air duct surrounding said main trunk and feeder ducts and comprising sealed ceiling and wall structure of said building, each feeder duct including damper means within said feeder duct and opening into said cold air duct for mixing air from said main trunk warm air duct and said cold air duct, and blower means for feeding unheated air into said cold air duct.

References Cited in the file of this patent

UNITED STATES PATENTS 2,609,183     Fitzgerald  ---------------- Sept. 2, 1952